Patented Jan. 7, 1936

2,026,894

UNITED STATES PATENT OFFICE 2,026,894

MANUFACTURE OF ACRYLIC ACID

Rowland Hill, Blackley, Manchester, England, assignor to Imperial Chemical Industries Limited, a corporation of Great Britain No Drawing. Application May 16, 1934, Serial No. 725,953. In Great Britain April 13, 1933

11 Claims. (Cl. 260—112)

The present invention relates to an improved method for the manufacture of acrylic acid.

It has previously been proposed to hydrolyze ethylene cyanohydrin with aqueous sodium hydroxide, isolate the sodium hydracrylate formed by evaporating the solution, heat the sodium hydracrylate to eliminate water, and recover the acrylic acid by distillation with sulphuric acid (Van den Berg. Rec. Trav. Chim. 1922, 41, 22).

According to the present invention, we make acrylic acid by treating ethylene cyanohydrin with sulphuric acid and water. The process is simple and the yield is good.

In carrying the invention in practical effect, ethylene cyanohydrin, sulphuric acid and water may be mixed in proportions corresponding to a sulphuric acid of about 80–96% $H_2SO_4$ content, the mixture heated and the acrylic acid recovered from the crystalline mush of ammonium bisulphate by solvent extraction, or by distillation, distillation being preferably under reduced pressure.

Antipolymerizing agents such as copper, hydroquinone, pyrogallol, tannic acid, diphenyl amine, and other active antioxidants are preferably introduced into the reaction mixture in order to prevent polymerization, especially during a distillation process.

The following examples in which parts are by weight, illustrate but do not limit the invention:

Example 1.—98 parts of sulphuric acid (sp. gr. 1.84/20° C.) are added to 71 parts of ethylene cyanohydrin and 2 parts of copper foil with stirring during ½ hour, the mixture being cooled with ice and salt. 18 parts of water are then added and the mixture warmed under reflux. At about 80° C. a fairly vigorous reaction begins, when heating should be stopped, and cooling effected if necessary. The temperature may rise to 130–140° C. but rapidly subsides. Heating is continued for 16 hours at 95° C. The semi-solid crystalline mass is extracted with 140 parts of acetone. 0.5 part of hydroquinone is added as stabilizer, and after removal of the acetone, 51 parts of acrylic acid b. p. 132–141° C. (chiefly 140° C.) can be isolated by fractional distillation.

Example 2.—116 parts of sulphuric acid (sp. gr. 1.77/20° C.) are added to 71 parts of ethylene cyanohydrin and 2 parts of copper. The mixture is then heated at 95° C. After 3 hours ammonium bisulphate starts to separate from the reaction mixture. After 18 hours, the whole is subjected to vacuum distillation under pressure of 30 mm. mercury. 54 parts of distillate are obtained, from which acrylic acid can be isolated in a pure condition by fractionation.

I claim:

1. In a process for the production of acrylic acid the step which comprises heating ethylene cyanohydrin with sulphuric acid and water.

2. In a process for the production of acrylic acid the step which comprises heating ethylene cyanohydrin with a sulphuric acid of 80–96% strength.

3. In a process for the production of acrylic acid the step which comprises heating ethylene cyanohydrin with sulphuric acid and water in the presence of an antipolymerizing agent.

4. In a process for the production of acrylic acid the step which comprises heating ethylene cyanohydrin with a sulphuric acid of 80–96% strength in the presence of an antipolymerizing agent.

5. In a process for the production of acrylic acid the step which comprises heating ethylene cyanohydrin with sulphuric acid and water in the presence of an antioxidant.

6. In a process for the production of acrylic acid the step which comprises heating ethylene cyanohydrin with sulphuric acid and water in the presence of copper.

7. In a process for the preparation of acrylic acid the steps which comprise adding 80–96% sulphuric acid to ethylene cyanohydrin, heating until the desired conversion has been obtained, and subsequently isolating the acrylic acid by fractional distillation from the crystallized mass.

8. In a process for the production of acrylic acid the step which comprises reacting ethylene cyanohydrin with sulphuric acid and water in the presence of hydroquinone.

9. In a process for the production of acrylic acid the step which comprises reacting ethylene cyanohydrin with sulphuric acid and water in the presence of pyrogallol.

10. A process for the production of acrylic acid which comprises adding to a mixture containing an antioxidant and ethylene cyanohydrin concentrated sulphuric acid, the mixture being cooled and stirred during the addition, adding water to the resulting mixture, heating until the reaction is initiated, stopping the input of heat until the vigorous evolution of exothermic heat has subsided, and subsequently heating the reaction mixture until the reaction is substantially complete.

11. A process for the production of acrylic acid which comprises adding to a mixture containing approximately 2 parts of copper foil and approximately 71 parts of ethylene cyanohydrin, about 98 parts of concentrated sulphuric acid, the mixture being stirred and cooled during the addition of the concentrated sulphuric acid, adding water to the resulting mixture, heating to approximately 80° C., and after the vigorous reaction has subsided, maintaining the temperature at approximately 95° C., for about 16 hours, and subsequently separating the acrylic acid by extraction and fractional distillation.

ROWLAND HILL.